US012768382B2

(12) United States Patent
Ishida et al.

(10) Patent No.: US 12,768,382 B2
(45) Date of Patent: Oct. 20, 2026

(54) T-JOINT, BUILDING STRUCTURE, AND METHOD OF MANUFACTURING T-JOINT

(71) Applicant: NIPPON STEEL CORPORATION, Tokyo (JP)

(72) Inventors: Yoshinari Ishida, Tokyo (JP); Akinobu Kobayashi, Tokyo (JP); Takashi Yasutomi, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 751 days.

(21) Appl. No.: 17/798,246

(22) PCT Filed: Dec. 16, 2020

(86) PCT No.: PCT/JP2020/046966
§ 371 (c)(1),
(2) Date: Aug. 8, 2022

(87) PCT Pub. No.: WO2021/171749
PCT Pub. Date: Sep. 2, 2021

(65) Prior Publication Data

US 2023/0082468 A1 Mar. 16, 2023

(30) Foreign Application Priority Data

Feb. 26, 2020 (JP) ................................ 2020-030108
Feb. 26, 2020 (JP) ................................ 2020-030109
Feb. 26, 2020 (JP) ................................ 2020-030110

(51) Int. Cl.
*F16B 5/08* (2006.01)
*B23K 9/02* (2006.01)

(52) U.S. Cl.
CPC . *F16B 5/08* (2013.01); *B23K 9/02* (2013.01)

(58) Field of Classification Search
None
See application file for complete search history.

(56) References Cited

U.S. PATENT DOCUMENTS 7,005,607 B2 * 2/2006 Takatani ................ B23K 9/025
219/137 R
7,150,391 B2 * 12/2006 Fujimoto ............... B23K 10/00
219/121.64

(Continued)

FOREIGN PATENT DOCUMENTS

JP S60054274 A 3/1985
JP S62003878 A 1/1987

(Continued)

OTHER PUBLICATIONS

Miller—Welding Considerations for Designers and Fabricators, Modern Steel Construction, NASCC Steel conference, Feb. 2006. ( Year: 2006).*

(Continued)

*Primary Examiner* — Devang R Patel
(74) *Attorney, Agent, or Firm* — Rabin & Berdo, P.C.

(57) ABSTRACT

According to one aspect of the present invention, there is provided a T-joint including a first steel sheet, a second steel sheet, and a fillet welded part, in which the sheet thickness of the second steel sheet is 6.0 mm or less, the second steel sheet is stood on a first surface of the first steel sheet, the fillet welded part joins the first surface of the first steel sheet and a first surface of the second steel sheet to each other, at least one of the first surface of the first steel sheet or the first surface of the second steel sheet includes a zinc-based plating, an abutting end portion of the second steel sheet on a second surface side of the second steel sheet has an inclined surface, and in a cross section taken along a sheet thickness direction of the first steel sheet and a sheet thickness direction of the second steel sheet, the inclined surface forms an acute angle with respect to the first surface of the first steel sheet.

14 Claims, 10 Drawing Sheets

(56) References Cited

U.S. PATENT DOCUMENTS

| | | | | |
|---|---|---|---|---|
| 8,283,599 | B2 * | 10/2012 | Nakajima | B23K 9/025<br>219/137 R |
| 10,538,852 | B2 * | 1/2020 | Kobayashi | C22C 30/00 |
| 10,688,580 | B2 * | 6/2020 | Ogawa | B23K 31/003 |
| 2013/0153092 | A1 * | 6/2013 | Kasuya | C22C 38/04<br>148/320 |

FOREIGN PATENT DOCUMENTS

| | | | |
|---|---|---|---|
| JP | 2004098124 | A | 4/2004 |
| JP | 2014113641 | A | 6/2014 |
| JP | 2016198796 | A | 12/2016 |
| JP | 2019089099 | A | 6/2019 |

OTHER PUBLICATIONS

AWS Standard—Structural Welding Code—Steel—D1.1 (Year: 2015).*

* cited by examiner

T-JOINT, BUILDING STRUCTURE, AND METHOD OF MANUFACTURING T-JOINT

TECHNICAL FIELD OF THE INVENTION

The present invention relates to a T-joint, a building structure, and a method of manufacturing a T-joint.

Priority is claimed on Japanese Patent Application No. 2020-030108, filed on Feb. 26, 2020, Japanese Patent Application No. 2020-030109, filed on Feb. 26, 2020, and Japanese Patent Application No. 2020-030110, filed on Feb. 26, 2020, the contents of which are incorporated herein by reference.

RELATED ART

One example of a material forming a member that requires corrosion resistance is a zinc-based plated steel sheet. The zinc-based plated steel sheet is a generic term for steel sheets including a plating mainly formed of zinc, for example, a hot-dip galvanized steel sheet, a hot-dip galvannealed steel sheet, or an electrogalvanized steel sheet. The zinc-based plating has a sacrificial protection effect and can dramatically improve the corrosion resistance of the steel sheet.

On the other hand, in a case where a zinc-based plated steel sheet is welded to manufacture a member using the zinc-based plated steel sheet, the zinc-based plating of a steel sheet surface is vaporized by welding heat. The vaporized zinc-based plating, i.e. plating vapor forms bubbles in weld metal. The bubbles cause pore defects such as blowholes or pits to occur in a weld bead such that welding defects occur. The pore defect may deteriorate the external appearance quality of a welded part and further may decrease the joint strength. For example, according to "Clause 3.2.2 "Acceptance-Rejection Criterion of Internal Defects" of "Editorial Board of Design and Construction Manual for Sheet Welded Joint for Building (The Building Center of Japan, December, 2011)", a welded joint where a pore defect ratio in an X-ray transmission test is more than 30% is estimated as Fail. Regarding this description, in many housing manufacturers, the acceptance-rejection criterion of the pore defect ratio is 30% or less or 20% or less. A material and a welding method that do not satisfy this criterion are not adopted irrespective of the magnitude of the strength measurement result of welded joints.

The problem of pore defects may occur in various joints. For example, even when a T-joint is manufactured by fillet welding, the welding defects caused by the above-described plating vapor cause problems. FIG. 1 shows a cross-sectional image of a T-joint that is manufactured by fillet welding after standing a zinc-based plated steel sheet 11' on a zinc-based plated steel sheet 12'. The cross-sectional image is an image of a cross section taken along a sheet thickness direction of the zinc-based plated steel sheet 11' and a sheet thickness direction of the zinc-based plated steel sheet 12'. FIG. 2 shows an X-ray image of the T-joint. The X-ray image was obtained such that a weld bead extension direction and a longitudinal direction of the image of FIG. 2 match with each other. Spotted dark regions present in a fillet welded part 13' are pore defects d. The pore defects d are estimated to occur due to plating vapor.

In order to solve the pore defects that are problems when a T-joint is manufactured by fillet welding of a zinc-based plated steel sheet, various methods are disclosed.

For example, Patent Document 1 discloses a fillet welding method of a galvanized steel sheet in which a galvanized steel sheet is used as either or both of a first steel sheet and a second steel sheet and joint regions of the first steel sheet and the second steel sheet are arc-welded, the method including: providing a plurality of grooves in the entire joint region of the first steel sheet; allowing an abutting surface of the second steel sheet to abut against the joint region of the first steel sheet such that the abutting surface of the second steel sheet intersects with each of the grooves; and arc-welding the joint regions in a state where both end portions of each of the grooves on both sides of the abutting surface of the second steel sheet are exposed.

Patent Document 2 discloses an arc welding method of joining abutting portions of two members at least one of which is coated with a zinc-based plating to form a T-joint, the arc welding method including: providing, assuming that a member of which a surface is an abutting portion is a transversal member and a member of which an end surface is an abutting portion is a longitudinal member, one or more projections that protrude from the end surface by plastic working of compressing the end surface of the longitudinal member in a thickness direction; and performing arc welding after making the longitudinal member to abut against the transversal member through the projections to form gaps having a size corresponding to a projection amount of the projections between the longitudinal member and the transversal member.

Patent Document 3 discloses a vertical sheet member for T-shaped flat fillet arc welding in which a groove shape that forms a bottom surface of the vertical sheet member for T-shaped flat fillet arc welding is formed such that an inclined surface having a downhill gradient from one surface to another surface and an inclined surface having an uphill gradient from the one surface to the other surface are alternately provided along a longitudinal direction of the vertical sheet member.

Patent Document 4 discloses a vertical sheet member for T-shaped fillet arc welding in which, in a range of ⅕ or less of the thickness of the vertical sheet member from one surface of the vertical sheet member for welding, a root surface having a length that is 1/10 or less of the thickness of the vertical sheet member is formed in a longitudinal direction of the vertical sheet member and an inclined surface having an uphill gradient of 3° or more and 10° or less from a ridge of the root surface to another surface is formed.

Patent Document 5 discloses a welding method of making a first base metal having a single-side groove abut against a second base metal in a T-shape and welding the first and second base metals, the method including: removing a tack welded part of the first base metal and the second base metal up to a predetermined thickness; making a welding wire to face a groove welded part formed using the first base metal and the second base metal; melting groove welded part from the groove side by arc from the welding wire while moving the welding wire in a welding direction; and extruding the melt to the groove back side to form a root pass bead.

However, in the techniques of the related art disclosed in said Patent Documents, it is necessary to perform complex machining on a zinc-based plated steel sheet before welding. Since costs required for the machining are high, the method of suppressing the pore defects according to the techniques in the related art is not economical. In addition, as a result of investigation by the present inventors, it was found that, when these techniques in the related art are applied to arc welding of a zinc-based plated steel sheet, the effect of suppressing pore defects may not be sufficient. Further, the machining may cause a decrease in the mechanical strength of members.

PRIOR ART DOCUMENT

Patent Document

[Patent Document 1] Japanese Unexamined Patent Application, First Publication No. 2016-198796
[Patent Document 2] Japanese Unexamined Patent Application, First Publication No. 2014-113641
[Patent Document 3] Japanese Unexamined Patent Application, First Publication No. S62-3878
[Patent Document 4] Japanese Unexamined Patent Application, First Publication No. S60-54274
[Patent Document 5] Japanese Unexamined Patent Application, First Publication No. 2004-98124

DISCLOSURE OF THE INVENTION

Problems to be Solved by the Invention

The present invention has been made in consideration of the above-described circumstances and an object thereof is to provide a T-joint obtained by fillet welding a zinc-based plated steel sheet in which the occurrence of pore defects in a weld bead can be suppressed under various welding conditions, a method of manufacturing the same, and a building structure including the T-joint.

Means for Solving the Problem

The summary of the present invention is as follows.

(1) According to one aspect of the present invention, there is provided a T-joint including a first steel sheet, a second steel sheet, and a fillet welded part, in which a sheet thickness of the second steel sheet is 6.0 mm or less, the second steel sheet is stood on a first surface of the first steel sheet, the fillet welded part joins the first surface of the first steel sheet and a first surface of the second steel sheet to each other, at least one of the first surface of the first steel sheet or the first surface of the second steel sheet includes a zinc-based plating, an abutting end portion of the second steel sheet on a second surface side of the second steel sheet has an inclined surface, and in a cross section taken along a sheet thickness direction of the first steel sheet and a sheet thickness direction of the second steel sheet, the inclined surface forms an acute angle with respect to the first surface of the first steel sheet.

(2) In the T-joint according to (1), the weld metal of the fillet welded part may be exposed in the inclined surface.

(3) In the T-joint according to (1) or (2), the sheet thickness of the second steel sheet may be 4.5 mm or less.

(4) In the T-joint according to any one of (1) to (3), the pore defect ratio with respect to an entire length of the fillet welded part may be 30% or less.

(5) According to another aspect of the present invention, there is provided a building structure including the T-joint according to any one of (1) to (4).

(6) According to still another aspect of the present invention, there is provided a method of manufacturing a T-joint, the method including: standing a second steel sheet on a first surface of a first steel sheet; and fillet welding the first surface of the first steel sheet to a first surface of the second steel sheet, in which the sheet thickness of the second steel sheet is 6.0 mm or less, at least one of the first surface of the first steel sheet or the first surface of the second steel sheet includes a zinc-based plating, and when the second steel sheet is stood on the first surface of the first steel sheet, in a cross section taken along a sheet thickness direction of the first steel sheet and a sheet thickness direction of the second steel sheet, the second steel sheet has an inclined surface in an end portion of a second surface of the second steel sheet on the first steel sheet side, the inclined surface forming an acute angle with respect to the first surface of the first steel sheet.

(7) In the method of manufacturing a T-joint according to (6), the fillet welding may be performed such that a weld metal of a fillet welded part is exposed in the inclined surface.

(8) In the method of manufacturing a T-joint according to (6) or (7), the sheet thickness of the second steel sheet may be 4.5 mm or less.

(9) In the method of manufacturing a T-joint according to any one of (6) to (8), when the second steel sheet is stood on the first surface of the first steel sheet, in the cross section taken along the sheet thickness direction of the first steel sheet and the sheet thickness direction of the second steel sheet, the second steel sheet may have an inclined surface in an end portion of the first surface of the second steel sheet on the first steel sheet side, the inclined surface forming an acute angle with respect to the first surface of the first steel sheet.

Effects of the Invention

According to the present invention, it is possible to provide a T-joint obtained by fillet welding a zinc-based plated steel sheet in which the occurrence of pore defects in a weld bead can be suppressed under various welding conditions, a method of manufacturing the same, and a building structure including the T-joint.

EMBODIMENTS OF THE INVENTION

The present inventors conducted a thorough investigation on a T-joint where the occurrence of pore defects in a weld bead can be suppressed under various welding conditions, a building structure, and a method of manufacturing a T-joint.

As a result of the investigation by the present inventors, it was found that there is a relationship between the arc voltage and the frequency of occurrence of pore defects. Specifically, the present inventors prepared T-joints under various different arc voltages and found that pore defects are likely to occur at a specific arc voltage. The arc voltage at which pore defects are likely to occur varied depending on the material of a base metal, or the like.

However, during actual welding, it is difficult to suppress pore defects by adjusting the arc voltage. The reason is that the arc voltage is an important welding parameter and is determined for a purpose other than the suppression of pore defects. For example, during arc welding, the welding voltage is controlled such that the arc length is in an appropriate range. By adjusting the arc length to be in an appropriate range, the occurrence of spatters that cause poor appearance of the T-joint can be suppressed.

Here, there is a problem in that a combination of a welding current and an arc voltage where spatters are likely to be suppressed does not always match with a combination of a welding current and an arc voltage where pore defects are likely to be suppressed. When the welding current and the arc voltage are set to suppress spatters, there may be a case where pore defects cannot be suppressed.

The present inventors repeated further investigation on a T-joint where the occurrence of pore defects in a weld bead can be suppressed under various welding conditions, specifically, under various welding currents and arc voltages and a method of manufacturing the T-joint. The present inventors found that it is extremely effective to provide a valley section on a side opposite to the weld bead in order to suppress pore defects under various welding conditions.

Figure 1:
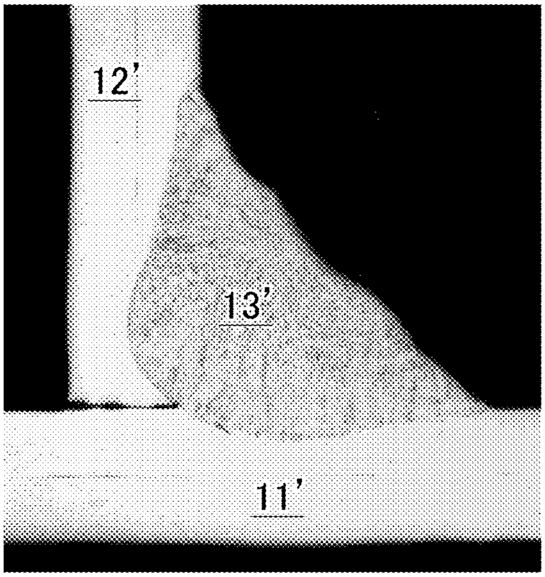
FIG. 1 (RELATED ART)
FIG. 1 is a cross-sectional image of a T-joint manufactured by fillet welding of a zinc-based plated steel sheet (Conventional Example).
Figure 2:
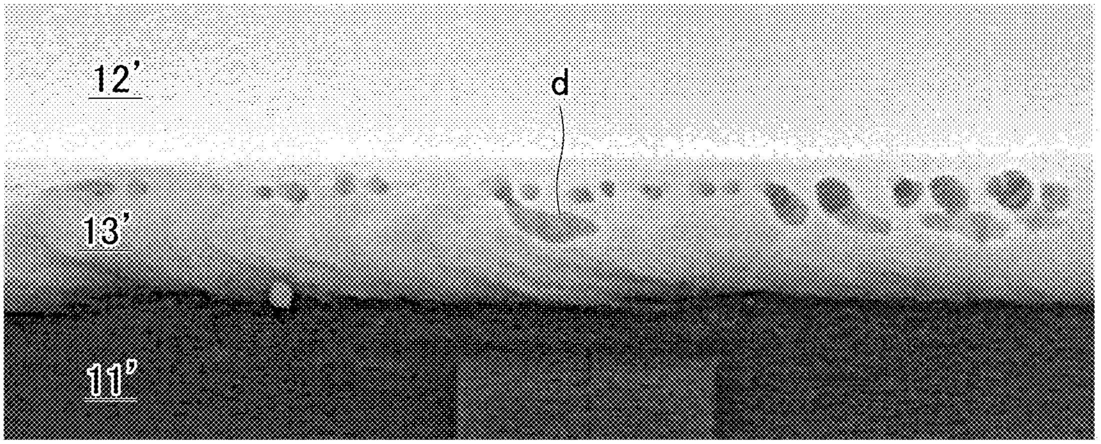
FIG. 2 (RELATED ART)
FIG. 2 is an X-ray image of the T-joint manufactured by fillet welding of the zinc-based plated steel sheet (Conventional Example).
Figure 4A:
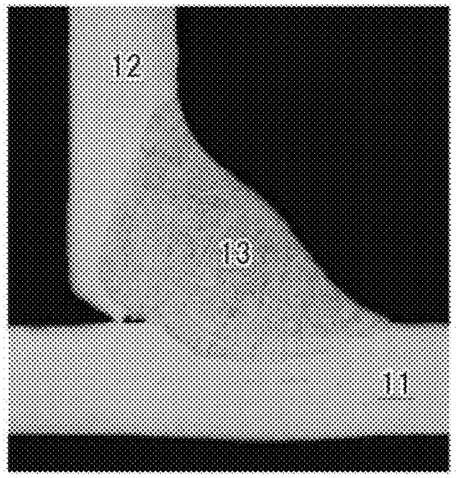
FIG. 4A is a cross-sectional image of a T-joint according to one aspect of the present invention.
Figure 4B:
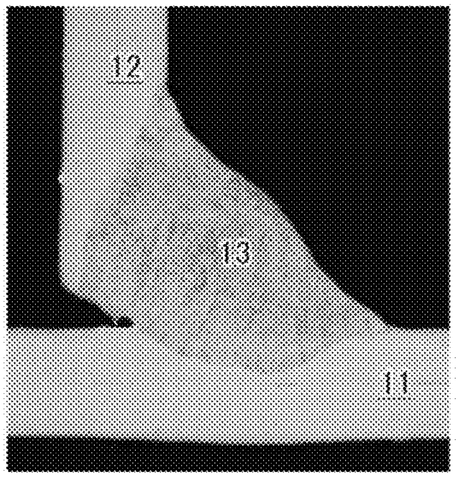
FIG. 4B is a cross-sectional image of a T-joint according to another aspect of the present invention.
Figure 4C:
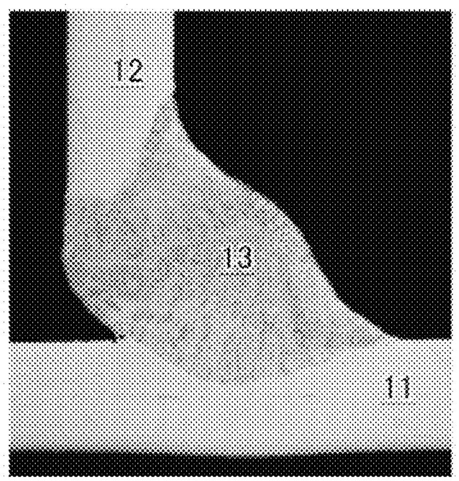
FIG. 4C is a cross-sectional image of a T-joint according to still another aspect of the present invention.
Figure 5A:
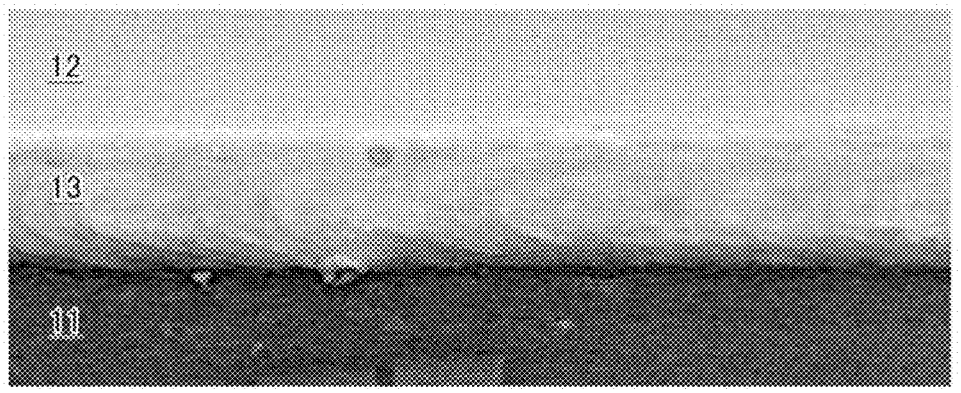
FIG. 5A is an X-ray image of a T-joint according to the one aspect of the present invention.
Figure 5B:
FIG. 5B is an X-ray image of a T-joint according to the other aspect of the present invention.
Figure 5C:
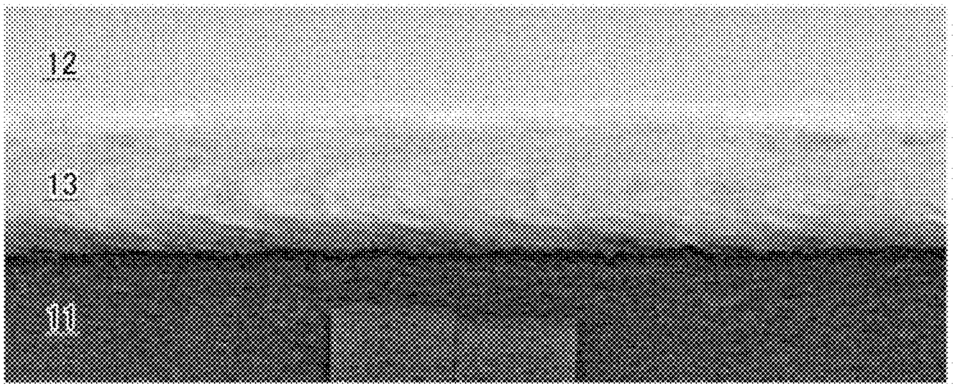
FIG. 5C is an X-ray image of a T-joint according to the still another aspect of the present invention.
Figure 6:
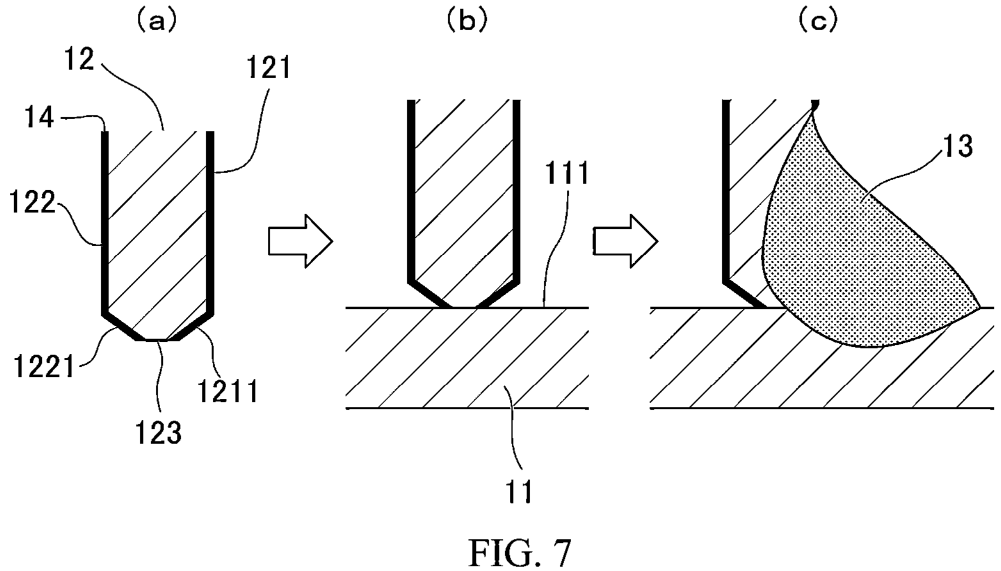
FIG. 6 is a conceptual diagram showing a method of manufacturing a T-joint according to one aspect of the present invention.

FIGS. 4A to 4C show cross-sectional images perpendicular to a weld bead (fillet welded part 13) extension direction of a T-joint where a valley section is provided, and FIGS. 5A to 5C show X-ray images of these T-joints. FIG. 4A corresponds to FIG. 5A, FIG. 4B corresponds to FIG. 5B, and FIG. 4C corresponds to FIG. 5C. The X-ray image was obtained such that the weld bead extension direction and a longitudinal direction of each of the images of FIGS. 5A to 5C match with each other. As compared to a T-joint where a valley section is not provided shown in FIG. 2, the amount of occurrence of pore defects in the T-joint shown in each of FIGS. 5A to 5C is significantly smaller. The reason for this is presumed to be that plating vapor produced during welding is discharged from the valley section.

In addition, one focus point is that the amount of occurrence of pore defects is suppressed irrespective of a weld penetration depth. There is a close relationship between the welding conditions and the weld penetration depth. The welding energy depends on the product of the arc voltage and the welding current. As the arc voltage increases, the arc spreads. Therefore, the energy density input to the welded part decreases. That is, as the arc voltage increases, the width of weld metal tends to increase, and the weld penetration depth tends to decrease. On the other hand, even when the welding current increases, the arc does not spread that much. Therefore, the energy density input to the welded part increases. That is, as the welding current increases, the weld penetration depth increases. In the T-joint of FIG. 4A, a lower welding current than that of other joints is applied, and the weld penetration depth is smaller. In the T-joint of FIG. 4C, a higher welding current than that of other joints is applied, and the weld penetration depth is larger. The fact that the amounts of occurrence of pore defects were suppressed in all of the joints shows that, in the T-joint according to the embodiment, the amount of occurrence of pore defects can be suppressed under various welding conditions.

Figure 11:
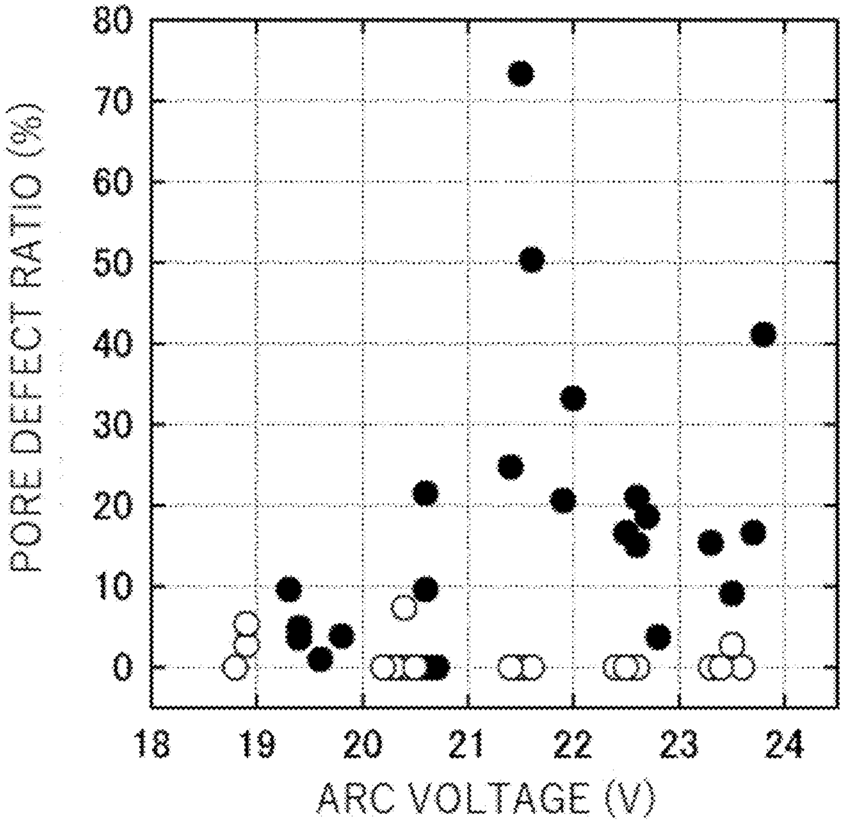
FIG. 11 is a graph showing pore defect ratios of a T-joint where the valley section is provided and a T-joint where the valley section is not provided, the T-joints being manufactured by fillet arc welding to which various arc voltages are applied.

Further, FIG. 11 shows pore defect ratios of a T-joint where the valley section is provided and a T-joint where the valley section is not provided, the T-joints being manufactured by fillet arc welding to which various arc voltages are applied. In the graph shown in FIG. 11, the horizontal axis represents the welding voltage that is applied during the manufacturing of the T-joint, and the vertical axis represents the pore defect ratio of the T-joint. In an experiment of FIG. 11, welding conditions (for example, welding current or welding speed) other than a sample material and the arc voltage are the same. The evaluation of the pore defect ratio was performed using a method described below. In this experiment, in the T-joint where the valley section was not provided, when the arc voltage was 21 V to 22 V, many pore defects occurred. On the other hand, in the T-joint where the valley section was provided, the pore defect ratio was suppressed to be 10% or less at various arc voltages.

The above-described valley section can be easily formed. A method of manufacturing the valley section is not particularly limited. For example, when a zinc-based plated steel sheet forming the T-joint is cut, by using a wedge-shaped blade portion (or annular blade portion) shown FIG. 7 or 8, an inclined surface can be formed in a cut end portion of the zinc-based plated steel sheet as shown in FIG. 9. When the zinc-based plated steel sheet having the inclined surface abuts against another steel sheet to perform fillet welding, a T-joint having the valley section is obtained.

Figure 7:
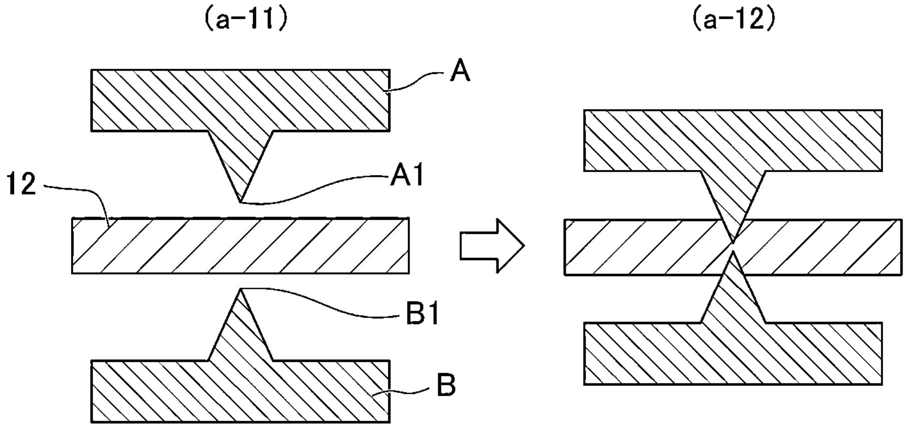
FIG. 7 is a conceptual diagram showing an example (a-1) of a method of cutting a second steel sheet.
Figure 8:
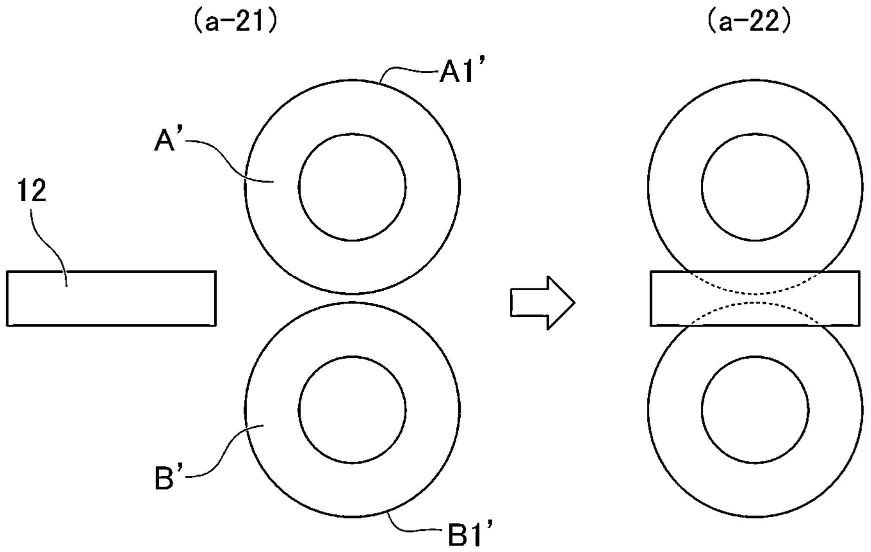
FIG. 8 is a conceptual diagram showing another example (a-2) of a method of cutting a second steel sheet.
Figure 9:
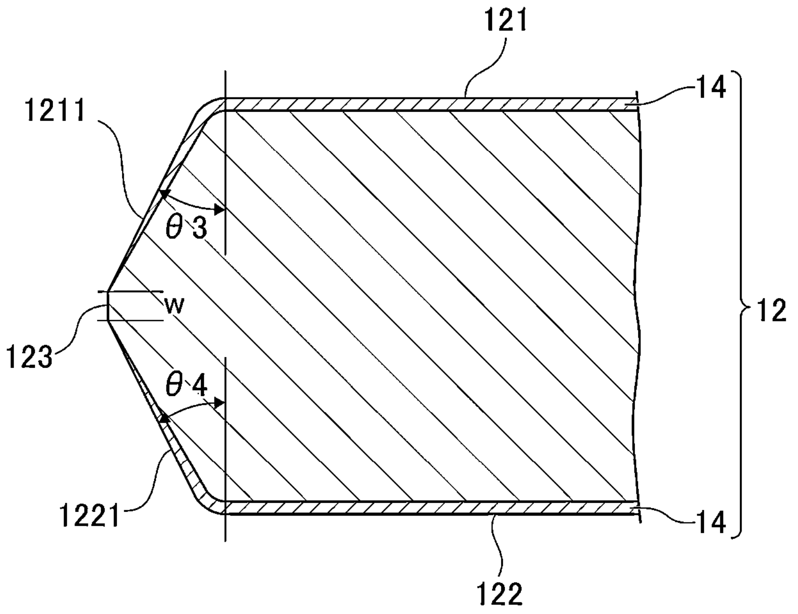
FIG. 9 is a schematic cross-sectional view showing one example of an end portion of the cut second steel sheet before welding.

Further, when the steel sheet including the zinc-based plating on the surface where the inclined surface is formed is cut using the method shown in FIG. 7 or 8, the zinc-based plating is attached to the inclined surface as a cut surface. This zinc-based plating remains on the inclined surface forming the valley section even after fillet welding, and the corrosion resistance of the valley section is improved.

This way, by disposing the valley section, the occurrence of pore defects can be suppressed under various welding conditions. In addition, by disposing the zinc-based plating on the inclined surface of the valley section, the corrosion resistance of the valley section can be improved. Further, the formation of the valley section and the disposition of the zinc-based plating on the inclined surface of the valley section can be performed together when the zinc-based plated steel sheet is cut to form a member shape. That is, with the T-joint according to the embodiment, the pore defects can be suppressed and the corrosion resistance can be improved, without increasing the number of manufacturing processes.

Figure 3A:
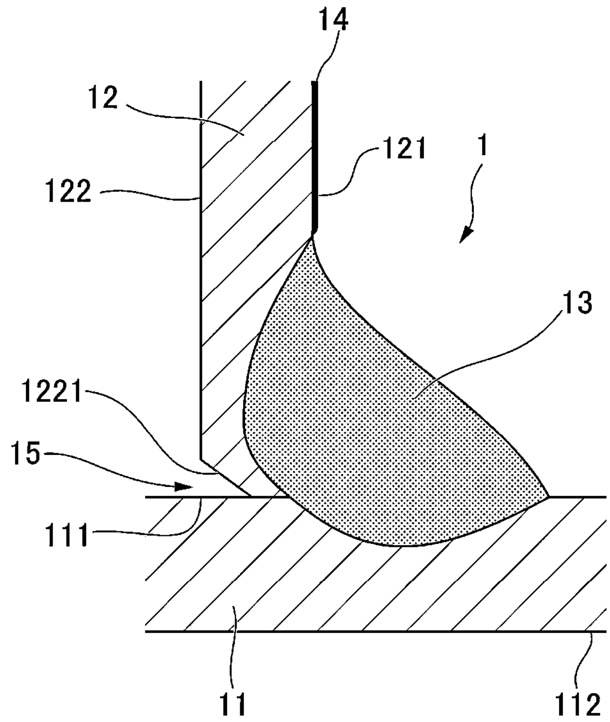
FIG. 3A is a schematic cross-sectional view of a T-joint according to one aspect of the present invention.

For example, as shown in FIG. 3A and the like, a T-joint 1 according to one aspect of the present invention that is completed based on the above-described findings includes a first steel sheet 11, a second steel sheet 12, and a fillet welded part 13, in which a sheet thickness of the second steel sheet 12 is 6.0 mm or less, the second steel sheet 12 is stood on a first surface 111 of the first steel sheet 11, the fillet welded part 13 joins the first surface 111 of the first steel sheet 11 and a first surface 121 of the second steel sheet 12 to each other, at least one of the first surface 111 of the first steel sheet 11 or the first surface 121 of the second steel sheet 12 includes a zinc-based plating 14, an abutting end portion of the second steel sheet 12 on a second surface 122 side of the second steel sheet 12 has an inclined surface 1221, and in a cross section taken along a sheet thickness direction of the first steel sheet 11 and the sheet thickness direction of the second steel sheet 12, the inclined surface 1221 forms an acute angle with respect to the first surface 111 of the first steel sheet 11. In other words, the T-joint 1 according to the one aspect of the present invention includes the first steel sheet 11, the second steel sheet 12 of which an end portion abuts against the first surface 111 of the first steel sheet 11, and the fillet welded part 13 that joins the first surface 111 of the first steel sheet 11 and the first surface 121 of the second steel sheet 12 to each other, in which either or both of the first surface 111 of the first steel sheet 11 and the first surface 121 of the second steel sheet 12 include the zinc-based plating 14, the second surface 122 of the second steel sheet 12 has the inclined surface 1221 in the abutting end portion of the second steel sheet 12, and the first surface 111 of the first steel sheet 11 and the inclined surface 1221 form the valley section 15. Hereinafter, the T-joint 1 according to the embodiment will be described in detail.

The T-joint 1 according to the embodiment is a joint where an end portion of one sheet abuts against a surface of another sheet. Here, for convenience of description, the steel sheet where the end portion abuts against the surface of the other sheet will be referred to as "second steel sheet 12", and the one steel sheet will be referred to as "first steel sheet 11". Accordingly, in the T-joint 1 according to the embodiment, the second steel sheet 12 is stood on the first surface 111 of the first steel sheet 11.

The types of the first steel sheet 11 and the second steel sheet 12 are not particularly limited, and a configuration described below can be appropriately adopted. In addition, the sheet thickness of the first steel sheet 11 is not particularly limited.

On the other hand, the sheet thickness of the second steel sheet 12 is 6.0 mm or less. In general, in fillet arc welding of a structure having a small sheet thickness, the weld penetration depth of a base metal is large with respect to the sheet thickness. Therefore, a sufficient penetration depth can be obtained even without performing full penetration weld through edge preparation, and the joint strength is satisfied in many cases. Further, when the sheet thickness is small, the steel sheet can be cut with high efficiency at a low cost using a shearing method such as a slitter or a press, and the production costs can be suppressed to the highest degree by performing welding in this state. Accordingly, in a T-joint in the related art, an end portion of a steel sheet having a sheet thickness of 6.0 mm or less is not processed before welding. In addition, when welding is performed with an unnecessarily large size in fillet arc welding, thermal strain is large, and HAZ is wide. Therefore, when the sheet thickness is large, typically, the heat input per one side of the weld bead is decreased by fillet welding on both side thereof, and the weld penetration depth is increased by edge preparation. This method is used for manufacturing a T-joint having a sheet thickness of 4.5 mm or more, in particular, 6.0 mm or more. Conversely, a structure having a small sheet thickness is widely used for one-side fillet welding where edge preparation is not performed. However, in the T-joint 1 according to the embodiment, although the sheet thickness of the second steel sheet 12 is 6.0 mm or less, the inclined surface 1221 described below is formed on the end portion of the second steel sheet 12 to suppress the occurrence of pore defects. The sheet thickness of the second steel sheet 12 may be 5.5 mm or less, 5.0 mm or less, 4.5 mm or less, 4.0 mm or less, or 3.5 mm or less. The lower limit of the sheet thickness of the second steel sheet 12 is not particularly limited and may be, for example, 1.5 mm or more or 2.0 mm or more.

In addition, the T-joint 1 according to the embodiment is manufactured by performing fillet welding such that the fillet welded part 13 is disposed at an intersection line between one surface of the first steel sheet 11 and one surface of the second steel sheet 12. The fillet welded part 13 is formed of weld metal and joins the first steel sheet 11 and the second steel sheet 12 to each other. Here, for convenience of description, in the T-joint according to the embodiment, among the surfaces of the first steel sheet 11, the surface on which fillet welding is performed will be referred to as "the first surface 111 of the first steel sheet 11", and a surface on which fillet welding is not performed will be referred to as "second surface 112 of the first steel sheet 11". In addition, among the surfaces of the second steel sheet 12, the surface on which fillet welding is performed will be referred to as "the first surface 121 of the second steel sheet 12", and the surface on which fillet welding is not performed will be referred to as "the second surface 122 of the second steel sheet 12".

The T-joint according to the embodiment further includes the zinc-based plating 14. The zinc-based plating 14 is a plating mainly formed of zinc, for example, a hot-dip galvanized plating, a hot-dip galvannealed plating, or an electrogalvanized plating. The zinc-based plating 14 has a sacrificial protection effect and can dramatically improve the corrosion resistance of the steel sheet. In order to ensure corrosion resistance, in the T-joint 1 according to the embodiment, the zinc-based plating 14 is disposed on at least one of the first surface 111 of the first steel sheet 11 or the first surface 121 of the second steel sheet 12.

On the other hand, of course, the zinc-based plating 14 may be disposed on another surface. In the T-joint 1 shown in FIG. 3B, the zinc-based plating 14 is disposed not only on the first surface 121 of the second steel sheet 12 but also on the second surface 122 of the second steel sheet 12. It is preferable that the zinc-based plating 14 is disposed on both surfaces of each of the first steel sheet 11 and the second steel sheet.

The zinc-based plating 14 improves the corrosion resistance of the T-joint 1 but may cause welding defects in the T-joint 1. The zinc-based plating 14 is vaporized to produce plating vapor during welding. The plating vapor causes pore defects such as blowholes or pits to occur in weld bead such that welding defects occur. In order to solve this problem, in the T-joint 1 according to the embodiment, the abutting end portion of the second steel sheet 12 has the inclined surface 1221 at the second surface 122 side of the second steel sheet 12. In the cross section taken along the sheet thickness direction of the first steel sheet 11 and the sheet thickness direction of the second steel sheet 12, the inclined surface 1221 forms an acute angle with respect to the first surface 111 of the first steel sheet 11. In other words, in the T-joint 1 according to the embodiment, the second surface 122 of the second steel sheet 12 has the inclined surface 1221 in the abutting end portion of the second steel sheet 12 (the end portion of the second steel sheet 12 that abuts against the first steel sheet 11), and the inclined surface 1221 and the first surface 111 of the first steel sheet 11 mainly form the valley section 15. As a result, the valley section 15 is disposed on the side opposite to the fillet welded part 13. The inclined surface 1221 is a surface that is positioned in the end portion of the second surface 122 of the second steel sheet 12 and is inclined at a small angle with respect to the second surface 122 of the second steel sheet 12, in which the sheet thickness of the second steel sheet 12 decreases toward the end portion.

The present inventors found that, in the T-joint where the valley section 15 is provided, the frequency of occurrence of pore defects in the fillet welded part 13 was significantly suppressed under various welding conditions. FIGS. 4A to 4C show cross-sectional images perpendicular to the weld bead (fillet welded part 13) extension direction of the T-joint 1 according to the embodiment where the valley section 15 is provided, and FIGS. 5A to 5C show X-ray images of these T-joints 1. The X-ray image was obtained such that the weld bead extension direction and a longitudinal direction of each of the images of FIGS. 5A to 5C matched with each other. As compared to the T-joint where the valley section is not provided shown in FIG. 2, the amount of occurrence of pore defects in the T-joint 1 according to the embodiment shown in each of FIGS. 5A to 5C is significantly smaller. The reason for this is presumed to be that plating vapor produced during welding is discharged from the valley section 15. Further, FIG. 11 shows pore defect ratios of a T-joint where the valley section is provided and a T-joint where the valley section is not provided, the T-joints being manufactured by fillet arc welding to which various arc voltages are applied. In this experiment, in the T-joint where the valley section was not provided, when the arc voltage was 21 V to 22 V, many pore defects occurred. On the other hand, in the T-joint where the valley section was provided, the pore defect ratio was suppressed to be 10% or less at various arc voltages.

Figure 3B:
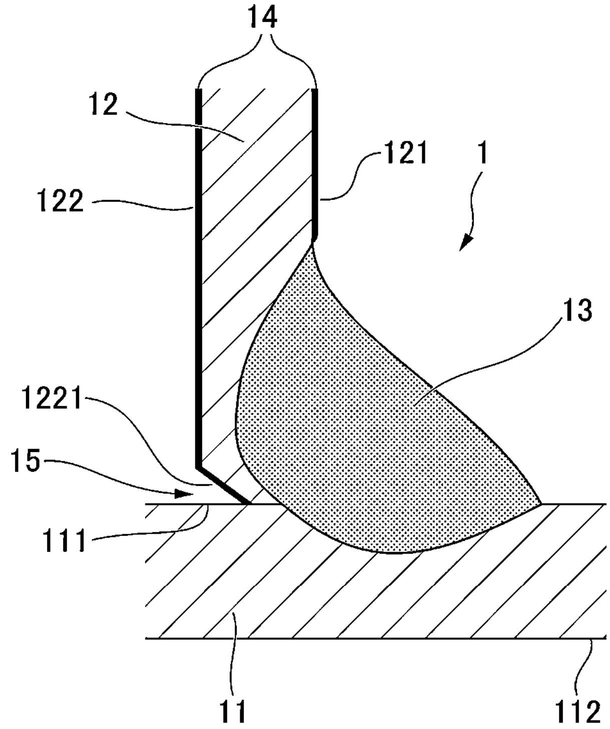
FIG. 3B is a schematic cross-sectional view of a T-joint according to another aspect of the present invention.

In addition, as shown in FIG. 3B, in the T-joint 1 according to the embodiment, it is preferable that the second surface 122 of the second steel sheet 12 and the inclined surface 1221 include the zinc-based plating 14. In the related art, a mechanism for discharging plating vapor is formed by additionally processing a steel sheet after plating (for example, refer to Patent Document 1). In the portion that is additionally processed, the base metal of the plated steel sheet is exposed. However, in the T-joint 1 according to the embodiment, the zinc-based plating 14 may be disposed on the inclined surface 1221. As a result, the corrosion resistance of the T-joint 1 can be further improved. It is most preferable that the zinc-based plating 14 is disposed on the entire area of the inclined surface 1221. However, the zinc-based plating 14 may be disposed on only a part of the inclined surface 1221.

In the T-joint 1 shown in FIG. 3A used for the above description, the weld penetration depth of the weld metal of the fillet welded part 13 is small. Accordingly, in the inclined surface 1221 of the second steel sheet 12 on the second surface 122 side, the weld metal of the fillet welded part 13 is not exposed. On the other hand, as shown in FIG. 3-3 or 3-4, the weld metal of the fillet welded part 13 may be exposed in a part or the entirety of the inclined surface 1221 of the second steel sheet 12 on the second surface 122 side.

In the cross section of the T-joint 1 shown in FIG. 3-3, the weld metal is exposed in a part of the inclined surface 1221. In other words, the T-joint 1 shown in FIG. 3-3 includes the first steel sheet 11, the second steel sheet 12 of which an end portion abuts against the first surface 111 of the first steel sheet 11, and the fillet welded part 13 that is formed of weld metal and joins the first surface 111 of the first steel sheet 11 and the first surface 121 of the second steel sheet 12 to each other, in which either or both of the first surface 111 of the first steel sheet 11 and the first surface 121 of the second steel sheet 12 include the zinc-based plating 14, the second surface 122 of the second steel sheet 12 has the inclined surface 1221 a part of which is formed of weld metal in the abutting end portion of the second steel sheet 12, and the first surface 111 of the first steel sheet 11 and the inclined surface 1221 form the valley section 15.

Figure 3C:
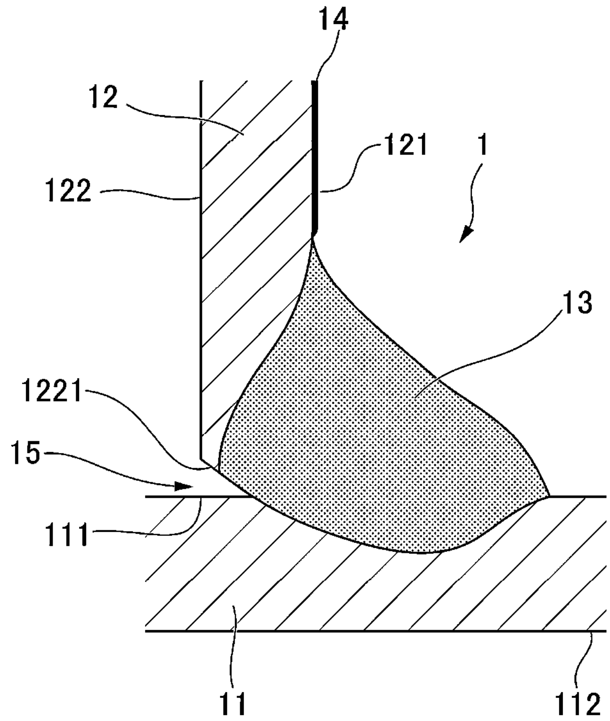
FIG. 3C is a schematic cross-sectional view of a T-joint according to still another aspect of the present invention.
Figure 3D:
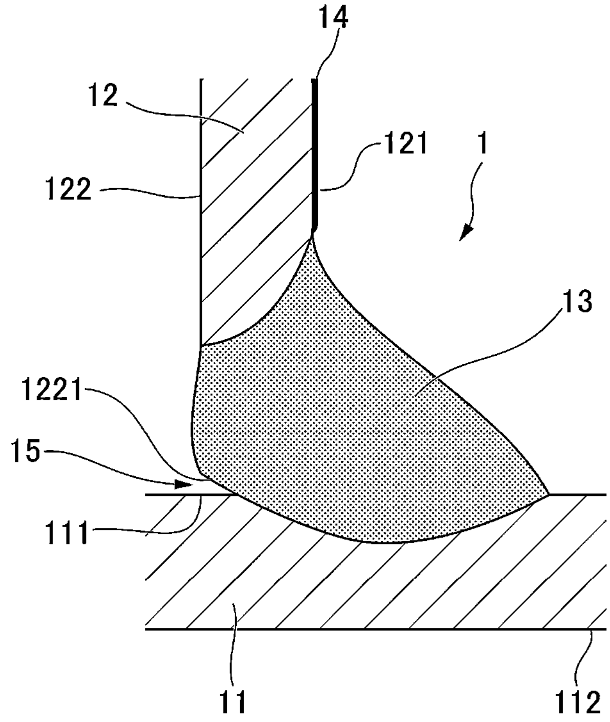
FIG. 3D is a schematic cross-sectional view of a T-joint according to still another aspect of the present invention.

In the cross section of the T-joint shown in FIG. 3D, the weld metal is exposed in the entirety of the inclined surface 1221. In other words, the T-joint 1 shown in FIG. 3D includes the first steel sheet 11, the second steel sheet 12 of which an end portion abuts against the first surface 111 of the first steel sheet 11, and the fillet welded part 13 that is formed of weld metal and joins the first surface 111 of the first steel sheet 11 and the first surface 121 of the second steel sheet 12 to each other, in which either or both of the first surface 111 of the first steel sheet 11 and the first surface 121 of the second steel sheet 12 include the zinc-based plating 14, the second surface 122 of the second steel sheet 12 has the inclined surface 1221 formed of weld metal in the abutting end portion of the second steel sheet 12, and the first surface 111 of the first steel sheet 11 and the inclined surface 1221 form the valley section 15.

There is a close relationship between the welding conditions and the weld penetration depth. For example, as the welding current increases, the weld penetration depth increases. However, in the T-joint according to the embodiment, even when the weld penetration depth is small (that is, the case shown in FIG. 3A) or the weld penetration depth is large (that is, the case shown in FIG. 3C), pore defects can be suppressed. Accordingly, in the T-joint according to the embodiment, the occurrence of pore defects in a weld bead can be suppressed under various welding conditions.

A method of manufacturing the T-joint 1 according to the embodiment is not particularly limited. Hereinafter, a preferable example of the manufacturing method will be described. With the method of manufacturing the T-joint according to the embodiment, the T-joint 1 according to the embodiment can be simply obtained. The T-joint that satisfies the above-described requirements is considered the T-joint 1 according to the embodiment irrespective of the manufacturing method.

For example, the method of manufacturing the T-joint according to the embodiment includes: standing the second steel sheet 12 on the first surface 111 of the first steel sheet 11; and fillet welding the first surface 111 of the first steel sheet 11 to the first surface 121 of the second steel sheet 12, in which a sheet thickness of the second steel sheet 12 is 6.0 mm or less, at least one of the first surface 111 of the first steel sheet 11 or the first surface 121 of the second steel sheet 12 includes the zinc-based plating 14, and when the second steel sheet 12 is stood on the first surface 111 of the first steel sheet 11, in a cross section taken along a sheet thickness direction of the first steel sheet 11 and a sheet thickness direction of the second steel sheet 12, the second steel sheet 12 has the inclined surface 1221 in an end portion of a second surface of the second steel sheet 12 on the first steel sheet 11 side, the inclined surface forming an acute angle with respect to the first surface 111 of the first steel sheet 11. As a result, the T-joint 1 according to the embodiment including the valley section 15 can be obtained.

In the inclined surface 1221 that is disposed in the end portion of the second surface of the second steel sheet 12 on the first steel sheet 11 side, fillet welding may be performed such that the weld metal of the fillet welded part is not exposed. On the other hand, in a part or the entirety of the inclined surface 1221, fillet welding may be performed such that the weld metal of the fillet welded part is exposed. In either case, with the method of manufacturing the T-joint according to the embodiment, the occurrence of pore defects can be suppressed.

The sheet thickness of the second steel sheet is 6.0 mm or less and, for example, as described above, may be 5.5 mm or less, 5.0 mm or less, 4.5 mm or less, 4.0 mm or less, or 3.5 mm. The lower limit of the sheet thickness of the second steel sheet 12 is not particularly limited and may be, for example, 1.5 mm or more or 2.0 mm or more.

A method of forming the inclined surface 1221 that is disposed on the end portion of the second surface of the second steel sheet 12 on the first steel sheet 11 side is not particularly limited. For example, the inclined surface 1221 can be formed by appropriately performing machining on the end portion of the second steel sheet 12 formed by shearing. On the other hand, with the method shown in FIGS. 6 to 9, the inclined surface 1221 can be simply formed. Hereinafter, the details will be described.

In a more preferable example of the method of manufacturing the T-joint according to the embodiment shown in FIGS. 6 to 9, when the second steel sheet 12 is stood on the first surface 111 of the first steel sheet 11, in a cross section taken along a sheet thickness direction of the first steel sheet 11 and a sheet thickness direction of the second steel sheet, the second steel sheet 12 has an inclined surface in an end portion of the first surface 121 of the second steel sheet 12 on the first steel sheet 11 side, the inclined surface forming an acute angle with respect to the first surface 111 of the first steel sheet 11. Hereinafter, for convenience of description, the inclined surface disposed on the first surface 121 of the second steel sheet 12 will be referred to as a first inclined surface 1211, and the inclined surface disposed on the second surface 122 of the second steel sheet 12 will be referred to as a second inclined surface 1221. In other words, the inclined surface is formed on both surfaces of the second steel sheet 12 at a stage before being provided for fillet welding.

In a more specific description, a more preferable example of the method of manufacturing the T-joint according to the embodiment includes:

(a) forming, on the end portion of the second steel sheet 12, the first inclined surface 1211 that is inclined from the first surface 121 to the center in the sheet thickness direction, the second inclined surface 1221 that is inclined from the second surface 122 to the center in the sheet thickness direction, and a fracture surface 123 that is disposed between the first inclined surface 1211 and the second inclined surface 1221;

(b) abutting the end portion of the second steel sheet 12 against the first surface 111 of the first steel sheet 11; and (c) fillet welding the first surface 111 of the first steel sheet 11 to the first surface 121 of the second steel sheet 12, in which either or both of the first surface 111 of the first steel sheet 11 and the first surface 121 of the second steel sheet 12 include the zinc-based plating 14.

(a) In a more preferable example of the method of manufacturing the T-joint according to the embodiment, first the first inclined surface 1211, the second inclined surface 1221, and the fracture surface 123 are formed in the end portion of the second steel sheet 12.

The first inclined surface 1211 of the second steel sheet 12 is formed to be inclined from the first surface 121 of the second steel sheet 12 to the sheet thickness center of the second steel sheet 12 in the sheet thickness direction of the second steel sheet 12.

The second inclined surface 1221 of the second steel sheet 12 is formed to be inclined from the second surface 122 of the second steel sheet 12 to the sheet thickness center of the second steel sheet 12 in the sheet thickness direction of the second steel sheet 12.

The fracture surface 123 of the second steel sheet 12 is disposed between the first inclined surface 1211 and the second inclined surface 1221.

The first inclined surface 1211, the second inclined surface 1221, and the fracture surface 123 of the second steel sheet 12 are suitably formed using a cutting method (hereinafter, also referred to as "cutting method a-1") including procedures a-11 to a-12, for example, as shown in FIG. 7.

(a-11) A die A that includes a wedge-shaped first blade portion A1 and a punch B that includes a wedge-shaped second blade portion B1 are disposed such that the first blade portion A1 and the second blade portion B1 face each other.

(a-12) The second steel sheet 12 is disposed between the die A and the punch B, and the punch B is relatively pressed to the die A side to cut the second steel sheet 12.

In the cutting method a-1, the cutting of the second steel sheet 12 and the formation of the inclined surface can be performed at the same time. Accordingly, the cutting method a-1 has an effect that the T-joint including the valley section can be easily manufactured.

Further, when the second steel sheet 12 includes the zinc-based plating 14 on the second surface 122, the zinc-based plating 14 attached to the second surface 122 of the second steel sheet 12 can be disposed on the second inclined surface 1221 using the cutting method a-1. In the cutting method a-1, by using a tensile force generated between the first and second blade portions A1 and B1 and the second steel sheet 12 when the punch B is pressed into the die A, the zinc-based plating 14 of the surface of the second steel sheet 12 enters into a cut end surface such that the cut end surface can be coated with the zinc-based plating 14. That is, the zinc-based plating 14 of the surface of the second steel sheet 12 can follow the movement of the first blade portion A1 and the second blade portion B1 relative to the second steel sheet 12 when the punch B is pressed into the die A, and thus the zinc-based plating 14 can enter into the cut end surface. As a result, the cutting of the second steel sheet 12, the formation of the inclined surface, and the disposition of the zinc-based plating 14 on the second inclined surface 1221 can be performed at the same time. In this cutting method, the second steel sheet 12 is plastically deformed by the first blade portion A1 and the second blade portion B1 to form a necking portion. This necking portion is cracked and fractured to form the fracture surface 123.

In addition, the first inclined surface 1211, the second inclined surface 1221, and the fracture surface 123 of the second steel sheet 12 are also suitably formed using a cutting method (hereinafter, also referred to as "cutting method a-2") including procedures a-21 to a-22, for example, as shown in FIG. 8.

(a-21) A first annular blade portion A' and a second annular blade portion B' having a V-shape in cross-section in a radial direction of the cutting edge are disposed such that the cutting edges face each other.

(a-22) By causing the second steel sheet to pass through a gap between a cutting edge A1' of the first annular blade portion A' and a cutting edge B1' of the second annular blade portion B', the cutting edges are pressed into the second steel sheet 12 to cut the second steel sheet 12.

In the cutting method a-2, by causing the second steel sheet to pass through a gap between the first annular blade portion and the second annular blade portion that are rotating, the first annular blade portion and the second annular blade portion are pressed into the second steel sheet. As a result, as in the cutting method a-1, the cutting of the second steel sheet 12 and the formation of the inclined surface can be performed at the same time. Further, when the second steel sheet 12 includes the zinc-based plating 14 on the second surface 122, by using a tensile force generated between the first and second annular blade portions and the second steel sheet 12 during the cutting of the second steel sheet 12, the zinc-based plating 14 of the surface of the second steel sheet 12 enters into a cut end surface such that the cut end surface can be coated with the zinc-based plating 14.

When the second steel sheet 12 includes the zinc-based plating 14 on the second surface 122, a schematic cross-sectional view of the end portion of the second steel sheet 12 that is obtained using the cutting method a-1 or a-2 is shown in FIG. 9. The first inclined surface 1211 and the second inclined surface 1221 are configured with a shear droop and a linear portion. The shear droop is deformation caused by a tensile force acting on the surface of the second steel sheet 12 when the second steel sheet 12 is cut by the blade portion or the annular blade portion. When the zinc-based plating 14 is disposed on the second surface 122 of the second steel sheet 12, the second inclined surface 1221 is coated with the zinc-based plating 14.

(b) In a more preferable example of the method of manufacturing the T-joint according to the embodiment, the end portion of the second steel sheet 12 is made to abut against the first surface 111 of the first steel sheet 11. Of course, the end portion that abuts against the first steel sheet 11 is the end portion including the first inclined surface 1211, the second inclined surface 1221, and the fracture surface 123. An abutting method is not particularly limited, and various methods for manufacturing the T-joint in the related art can be adopted.

(c) In a more preferable example of the method of manufacturing the T-joint according to the embodiment, the first surface 111 of the first steel sheet 11 is fillet welded to the first surface 121 of the second steel sheet 12. As a result, the first inclined surface 1211 is incorporated into the fillet welded part 13 of the T-joint 1, and the second inclined surface 1221 functions as the inclined surface 1221 of the T-joint 1.

During fillet welding, when the weld penetration depth of the fillet welded part 13 is large, the weld metal ranges up to the second inclined surface 1221 of the second steel sheet 12. Therefore, in the finally obtained T-joint, the zinc-based plating 14 may not be disposed in the second inclined surface 1221. Even in this case, as shown in the cross-sectional images of FIGS. 4B and 4C, the weld metal is maintained substantially in the shape of the second inclined surface 1221 to form the inclined surface. Accordingly, even when the weld penetration depth is large, pore defects can be suppressed. Accordingly, fillet welding conditions are not particularly limited. A portion of the second inclined surface 1221 which is not incorporated into the weld metal becomes the inclined surface 1221 of the T-joint 1 while maintaining the state before welding. Therefore, when the zinc-based plating 14 is disposed on the second inclined surface 1221, the zinc-based plating 14 remains in the portion of the inclined surface 1221 of the T-joint 1, which is not incorporated into the weld metal.

Hereinabove, an example of the method of manufacturing the T-joint 1 according to the embodiment has been described. However, the method of manufacturing the T-joint according to the embodiment is not limited to the above-described method. For example, regarding the method of forming the valley section 15, only one inclined surface may be formed in the end portion of the second steel sheet 12 before welding instead of forming the two inclined surface. In addition, regarding the method of disposing the zinc-based plating 14 on the inclined surface 1221 of the valley section 15, the zinc-based plating 14 may be formed on the end portion (or the entire second steel sheet 12) after cutting the second steel sheet 12 instead of moving the zinc-based plating 14 of the surface of the second steel sheet 12 to the inclined surface during the cutting of the second steel sheet 12. However, from the viewpoint of the manufacturing efficiency, the manufacturing method described above is most suitable. In the inclined surface 1221 forming the valley section 15 of the T-joint 1 obtained using the manufacturing method described above, the thickness of the zinc-based plating 14 is not uniform as shown in FIG. 9 and typically gradually decreases from the surface of the second steel sheet 12 to the inside thereof.

Hereinafter, a more preferable aspect of the T-joint and the method of manufacturing the T-joint will be described.

The type of the first steel sheet 11 and the second steel sheet 12 is not particularly limited. The first steel sheet 11 and the second steel sheet 12 may be a hot-rolled steel sheet or a cold-rolled steel sheet. The strength of the first steel sheet 11 and the second steel sheet 12 is not particularly limited. The first steel sheet 11 and the second steel sheet 12 may be soft steel having a tensile strength of 270 MPa-grade or may be a high strength steel sheet having a tensile strength of 400 MPa-grade or 570 MPa-grade. The types of the first steel sheet 11 and the second steel sheet 12 are may be different from each other. Regarding the zinc-based plating 14 disposed on the surface of the first steel sheet 11 and/or the second steel sheet 12, the type, the component, and the adhesion amount, whether or not to perform chemical conversion, and the like are not particularly limited. Examples of the composition of the zinc-based plating 14 include Zn-11% Al-3% Mg-0.2% Si, Zn-6% Al-3% Mg, Zn-55% Al, and Zn-5% Al-0.1% Mg. The type of the zinc-based plating is not limited to the above examples.

The sheet thickness of the second steel sheet is as described above, and the sheet thickness of the first steel sheet 11 is not particularly limited. The sheet thickness of the first steel sheet 11 is, for example, 1.0 to 4.5 mm. The sheet thickness of the first steel sheet 11 may be 1.5 mm or more or may be 2.0 mm or more. The sheet thickness of the first steel sheet 11 may be 4.0 mm or less or may be 3.5 mm or less.

The components and the like of the fillet welded part 13 are not particularly limited. The fillet welded part 13 is weld metal that is formed by melting and solidifying the first steel sheet 11, the second steel sheet 12, and a welding material such as a welding wire. The components of the weld metal depend on the components of the first steel sheet 11, the second steel sheet 12, and the welding material and welding conditions. In order to improve the corrosion resistance of the fillet welded part 13, the welding material can contain a corrosion resistance improving element such as Ni or Cr.

The shape of the valley section 15 is not also particularly limited and can be appropriately selected in a range where plating vapor can be discharged. For example, the suitable shape of the valley section 15 is as follows.

The depth of the valley section 15 is preferably 10% or more and 70% or less of the thickness of the second steel sheet 12. By setting the depth of the valley section 15 to be 10% or more of the thickness of the second steel sheet 12, plating vapor can be more efficiently discharged, and the occurrence of pore defects can be further suppressed. In addition, by setting the depth of the valley section 15 to be 70% or less of the thickness of the second steel sheet 12, the joint strength of the T-joint 1 can be further increased. The depth of the valley section 15 may be 20% or more, 25% or more, 30% or more, or 40% or more of the thickness of the second steel sheet 12. The depth of the valley section 15 may be 65% or less, 60% or less, or 50% or less of the thickness of the second steel sheet 12.

The inclination angle of the valley section 15 is preferably 10° or more and less than 80°. By setting the inclination angle of the valley section 15 to be 10° or more, plating vapor can be more efficiently discharged, and the occurrence of pore defects can be further suppressed. In addition, by setting the inclination angle of the valley section 15 to be less than 80°, the joint strength of the T-joint 1 can be further increased. The inclination angle of the valley section 15 may be 15° or more, 20° or more, or 30° or more. The inclination angle of the valley section 15 may be 70° or less, less than 70°, 65° or less, 60° or less, or 50° or less.

Here, a depth D1 and an inclination angle θ1 of the valley section 15 are defined to vary depending on the weld penetration depth of the weld metal.

Figure 10A:
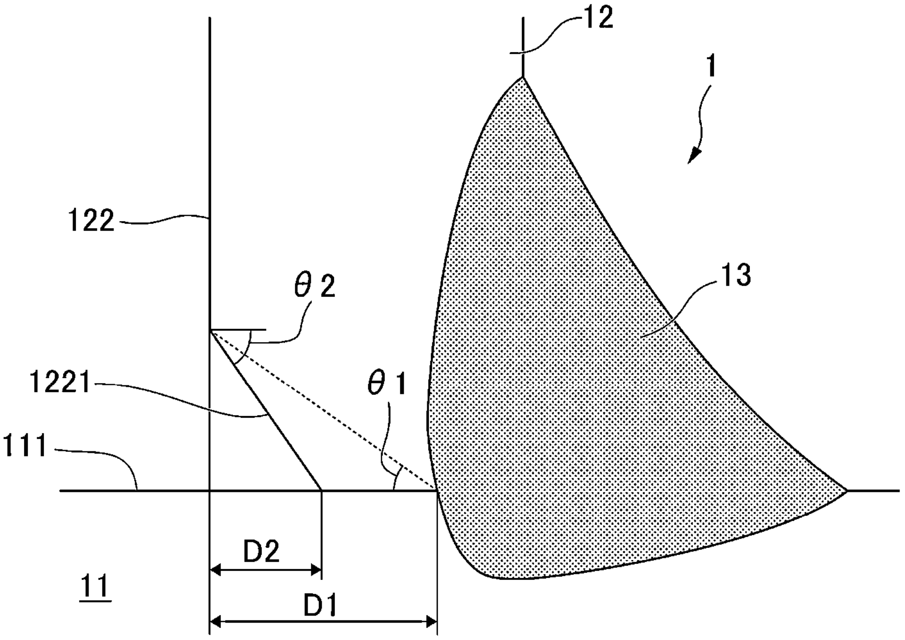
FIG. 10A is an enlarged cross-sectional view showing a valley section of the T-joint where a weld metal is not exposed in an inclined surface.

First, for the T-joint 1 where the weld metal of the fillet welded part is not exposed in the inclined surface 1221 that is disposed in the end portion of the second surface of the second steel sheet 12 on the first steel sheet 11 side (that is, the T-joint 1 shown in FIG. 3A), the depth D1 and the inclination angle θ1 of the valley section 15 are shown in FIG. 10A. The depth D1 of the valley section 15 is the distance between the second surface 122 of the second steel sheet and the bottom of the valley section 15 in a cross section of the T-joint 1 perpendicular to the weld bead extension direction, the distance being measured in the thickness direction of the second steel sheet 12. The bottom of the valley section 15 refers to a portion where an outer circumferential surface of the weld metal (fillet welded part 13) and the first surface 111 of the first steel sheet 11 intersect with each other. In addition, the inclination angle θ1 of the valley section 15 refers to a narrow angle of a line connecting a terminal at joint-outer-side of the inclined surface 1221 of the second steel sheet and the above-described bottom of the valley section 15 with respect to the first surface 111 of the first steel sheet 11, the narrow angle being measured in the cross section of the T-joint 1 perpendicular to the weld bead extension direction.

Figure 10B:
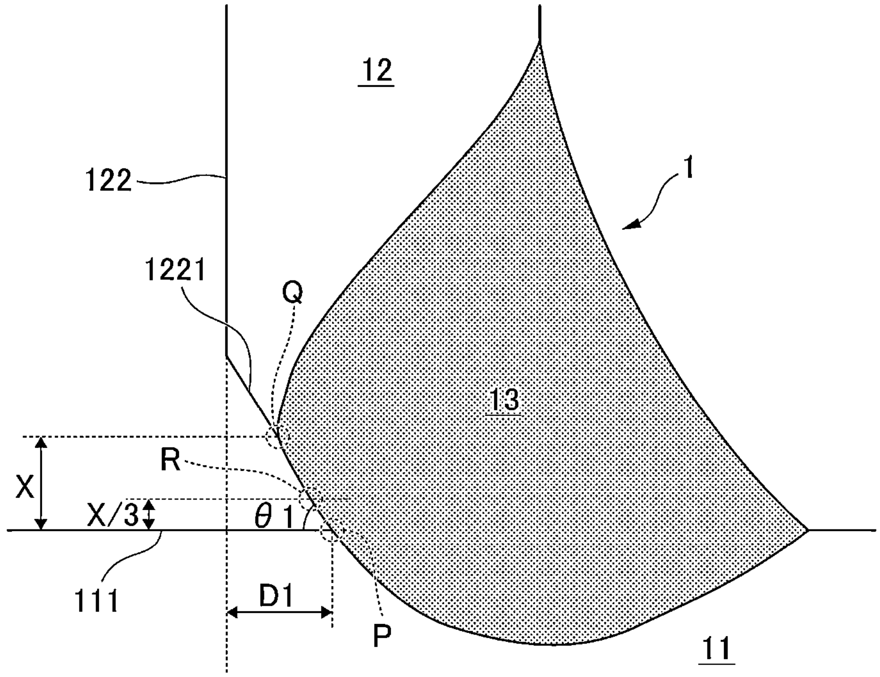
FIG. 10B is an enlarged cross-sectional view showing a valley section of the T-joint where a weld metal is exposed in a part of the inclined surface.

Next, for the T-joint 1 where the weld metal of the fillet welded part is exposed in a part of the inclined surface 1221 that is disposed in the end portion of the second surface of the second steel sheet 12 on the first steel sheet 11 side (that is, the T-joint 1 shown in FIG. 3B), the depth D1 and the inclination angle θ1 of the valley section 15 are shown in FIG. 10B. 'The depth D1 of the valley section 15 is the distance between the second surface 122 of the second steel sheet and the bottom P of the valley section 15 in a cross section of the T-joint 1 perpendicular to the weld bead extension direction, the distance being measured in the thickness direction of the second steel sheet 12. The bottom P of the valley section 15 refers to a portion where an outer circumferential surface of the weld metal (fillet welded part 13) and the first surface 111 of the first steel sheet 11 intersect with each other. The inclination angle θ1 of the valley section 15 is a narrow angle of a line connecting a point R and a bottom P with respect to the first surface 111 of the first steel sheet 11, in which the point R is an intersection of a straight line, which is spaced from the first surface 111 of the first steel sheet by ⅓ of a height X of a welding boundary Q and is parallel to the first surface 111 of the first steel sheet, and the outer circumferential surface of the weld metal at the side of valley section 15, the bottom P is the above-described bottom P of the valley section 15, and the narrow angle is measured in the cross section of the T-joint 1 perpendicular to the weld bead extension direction. Here, the welding boundary Q refers to a position where the weld metal forming the fillet welded part 13 and the second surface 122 of the second steel sheet 12 intersect with each other. The height X of the welding boundary Q refers to the distance between the welding boundary Q and the first surface 111 of the first steel sheet 11.

Figure 10C:
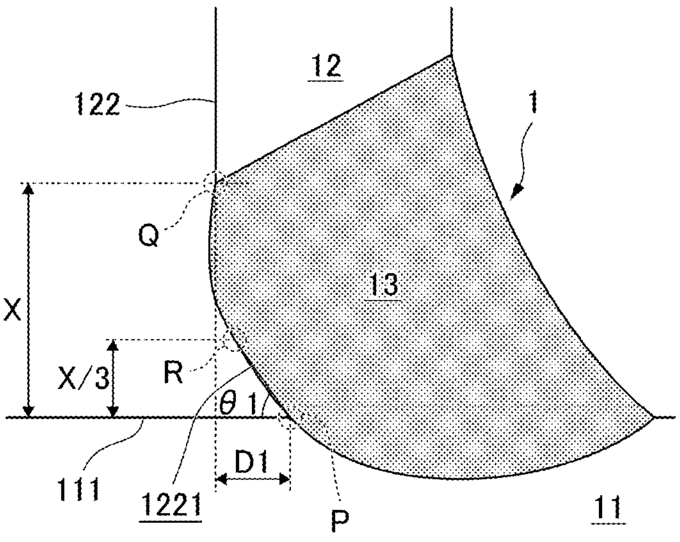
FIG. 10C is an enlarged cross-sectional view showing a valley section of the T-joint where a weld metal is exposed in the whole of the inclined surface.

Further, for the T-joint 1 where the weld metal of the fillet welded part is exposed in the entirety of the inclined surface 1221 that is disposed in the end portion of the second surface of the second steel sheet 12 on the first steel sheet 11 side (that is, the T-joint 1 shown in FIG. 3C), the depth D1 and the inclination angle θ1 of the valley section 15 are shown in FIG. 10C. The depth D1 of the valley section 15 is the distance between the second surface 122 of the second steel sheet and the bottom P of the valley section 15 in a cross section of the T-joint 1 perpendicular to the weld bead extension direction, the distance being measured in the thickness direction of the second steel sheet 12. The bottom P of the valley section 15 refers to a portion where an outer circumferential surface of the weld metal (fillet welded part 13) and the first surface 111 of the first steel sheet 11 intersect with each other. The inclination angle θ1 of the valley section 15 is a narrow angle of a line connecting a point R and a bottom P with respect to the first surface 111 of the first steel sheet 11, in which the point R is an intersection of a straight line, which is spaced from the first surface 111 of the first steel sheet by ⅓ of a height X of a welding boundary Q and is parallel to the first surface 111 of the first steel sheet, and the outer circumferential surface of the weld metal at the side of valley section 15, the bottom P is the above-described bottom P of the valley section 15, and the narrow angle is measured in the cross section of the T-joint 1 perpendicular to the weld bead extension direction. Here, the welding boundary Q refers to a position where the weld metal forming the fillet welded part 13 and the second surface 122 of the second steel sheet 12 intersect with each other. The height X of the welding boundary Q refers to the distance between the welding boundary Q and the first surface 111 of the first steel sheet 11.

The depth D1 of the valley section 15 and the inclination angle θ1 of the valley section 15 are the values depend on the inclination angle and the size of the second inclined surface 1221 of the second steel sheet 12 and the weld penetration depth of the fillet welded part 13. The inclination angle and the size of the second inclined surface 1221 can be appropriately adjusted by changing the sizes and the tip angles of the pair of blade portions (annular blade portions). In the end portion of the second steel sheet 12 before fillet welding shown in FIG. 9, the sizes of the first inclined surface 1211 and the second inclined surface 1221 are the same. However, by making the sizes of the pair of blade portions (annular blade portions) to vary, the sizes of the first inclined surface 1211 and the second inclined surface 1221 may be made to vary. In addition, the weld penetration depth of the fillet welded part 13 can be appropriately adjusted by changing the amount of heat input, the welding speed, and the like in fillet welding.

The shape of the inclined surface 1221 is not also particularly limited and can be appropriately selected in a range where plating vapor can be discharged.

For example, in the T-joint 1 where the weld metal of the fillet welded part is not exposed in the inclined surface 1221 that is disposed in the end portion of the second surface of the second steel sheet 12 on the first steel sheet 11 side, (that is, the T-joint 1 shown in FIG. 3A), a depth D2 of the inclined surface 1221 that is measured in the cross section of the T-joint 1 perpendicular to the weld bead extension direction may be 10% or more and 70% or less of the thickness of the second steel sheet 12. The depth D2 of the inclined surface 1221 refers to the distance between the second surface 122 of the second steel sheet and a terminal at inner side of the inclined surface 1221, the distance being measured in the thickness direction of the second steel sheet 12 in the cross section of the T-joint 1 perpendicular to the weld bead extension direction (refer to FIG. 10A). The depth D2 of the inclined surface is more preferably 15% or more, 20% or more, or 30% or more of the thickness of the second steel sheet 12. The depth D2 of the inclined surface is more preferably 60% or less, 55% or less, or 50% or less of the thickness of the second steel sheet 12.

In addition, regarding the T-joint 1 where the weld metal of the fillet welded part is not exposed (that is, the T-joint 1 shown in FIG. 3A), an inclination angle θ2 of the inclined surface 1221 that is measured in the cross section of the T-joint 1 perpendicular to the weld bead extension direction may be 10% or more and 60% or less. The inclination angle θ2 of the inclined surface 1221 refers to an angle between a line perpendicular to the second surface 122 of the second steel sheet 12 and the inclined surface 1221 (refer to FIG. 10A). The inclination angle θ2 of the inclined surface 1221 is more preferably 15° or more, or 20° or more. The inclination angle θ2 of the inclined surface 1221 is more preferably 50° or less, or 45° or less.

The inclined surface 1221 may be a flat surface or a curved surface. When the inclined surface 1221 is the curved surface, the inclined surface 1221 is recognized as a curved line in the cross section of the T-joint 1 perpendicular to the weld bead extension direction. In this case, the depth D2 of the inclined surface and the inclination angle θ2 between the inclined surface 1221 and the second surface 122 of the second steel sheet may be measured by considering a straight line connecting both ends of the curve as the inclined surface 1221.

It is preferable that the above-described various configurations of the T-joint 1 according to the embodiment are applied to the entire area of the abutting portion of the second steel sheet 12 in the weld bead extension direction. However, the various configurations of the T-joint 1 according to the embodiment may be applied to only a part of the T-joint 1. That is, a T-joint including only a part of the above-described configurations is considered to be the T-joint 1 according to the embodiment according to the embodiment. For example, by providing the valley section 15 intermittently in the bead extension direction, pore defects can be reduced. The depth of the valley section, the inclination angle of the valley section, and the like may change in the bead extension direction.

In addition, in the T-joint 1 according to the embodiment, the pore defect ratio with respect to the entire length of the fillet welded part 13 may be 30% or less, 28% or less, 25% or less, 20% or less, or 10% or less. As a result, the external appearance quality and the joint strength of the welded part of the T-joint 1 can be further improved. Here, the pore defect ratio is a value obtained in the following procedure. First, an X-ray image of the weld bead of the T-joint 1 is obtained. In the X-ray image, the ratio of the sum of the lengths of pore defects in the welding direction to the entire length of the weld bead including welding starting and terminal ends is considered to be the pore defect ratio.

A building structure according to another aspect of the present invention includes the above-described T-joint according to the embodiment. As a result, in the building structure according to the embodiment, the occurrence of pore defects is suppressed. In addition, during the manufacturing of the building structure according to the embodiment, various welding conditions can be adopted. Therefore, in the building structure according to the embodiment, spatters can be suppressed to improve the appearance, and the degree of freedom for design can be improved.

EXAMPLES

Example 1: T-Joint where Weld Metal of Fillet Welded Part was not Exposed in Inclined Surface On end portions of various steel sheets (second steel sheets), a first inclined surface that was inclined from the first surface to the center in the sheet thickness direction, a second inclined surface that was inclined from the second surface to the center in the sheet thickness direction, and a fracture surface that was disposed between the first inclined surface and the second inclined surface were formed. Next, the end portion of the second steel sheet was made to vertically abut against the first surface of each of various steel sheets (first steel sheet), and the first surface of the first steel sheet was fillet welded to the first surface of the second steel sheet. Here, as shown in FIG. 3A, fillet welding was performed such that the weld metal of the fillet welded part was not exposed in the inclined surface. In addition, the first inclined surface, the second inclined surface, and the fracture surface were formed using a cutting method including: disposing a die including a wedge-shaped first blade portion and a punch including a wedge-shaped second blade portion such that the first blade portion and the second blade portion face each other; disposing the second steel sheet between the die and the punch; and relatively pressing the punch to the die side to cut the second steel sheet. In addition, both of the first steel sheet and the second steel sheet were zinc-based plated steel sheets including a zinc-based plating on both surfaces.

In the end portion of the second steel sheet, inclination angles θ3 and θ4 of the inclined surfaces and a thickness W of the fracture surface (the ratio of percentage to the sheet thickness of the second steel sheet) are as shown in Table 1. The inclination angle θ3 of the first inclined surface refers to an angle between a line perpendicular to the first surface of the second steel sheet and the first inclined surface, and the inclination angle θ4 of the second inclined surface refers to an angle between a line perpendicular to the second surface of the second steel sheet and the second inclined surface (refer to FIG. 9).

TABLE 1

| | End Portion Shape of Second Steel Sheet | | |
|---|---|---|---|
| | Inclination Angle θ3 of First Inclined Surface (Degree) | Inclination Angle θ4 of Second Inclined Surface (Degree) | Thickness W of Fracture Surface (Percentage with respect to Sheet Thickness of Second Steel Sheet) |
| Comparative Example | No Inclined Surface | | |
| Example 1 | 36° | 63° | 16% |
| Example 2 | 30° | 30° | 33% |
| Example 3 | 15° | 15° | 9% |
| Example 4 | 37° | 63° | 16% |

In addition, conditions other than the shapes of the end portions of the steel sheets were as follows.

Sheet thickness of steel sheet: 2.3 mm

Strength of steel sheet: 400 MPa-grade

Component of zinc-based plating: Zn-11% Al-3% Mg-0.2% Si

Adhesion amount of zinc-based plating: 180 $g/m^2$ in total in both surfaces (minimum adhesion amount calculated on average at 3 points)

These steel sheets were provided for fillet gas shielded arc welding under the following conditions to prepare T-joints.

Welding wire: YM-28, manufactured by Nippon Steel Welding & Engineering Co., Ltd. (ϕ1.2 mm)

Welding speed: 40 cm/min

Welding Type: DC-$CO_2$ welding

Shielding gas type: $CO_2$

Shielding gas flow rate: 20 l/min

Welding current: appropriately adjusted in a range of 110 A to 160 A

Arc voltage: appropriately adjusted in a range of 17 V to 24 V

Bead length: 80 mm

An X-ray image of the weld bead of each of the various T-joints obtained as described above was obtained to investigate whether or not pore defects were present. Specifically, the ratio of the sum of the lengths of pore defects in the welding direction to the entire length of the weld bead including welding starting and terminal ends was considered to be the pore defect ratio, a case where the pore defect ratio was 30% or less was evaluated as "Pass", and the determination results are shown in Table 2.

In addition, the strength of the T-joint was evaluated using the following method. That is, the second steel sheet was directly held with a grip of a tension tester, and the first steel sheet was held with a grip through a jig, and the steel sheets were pulled in a direction away from each other at a rate of 10 mm/min. The holding position of the second steel sheet was spaced from the first surface of the first steel sheet by 75 mm. The holding position of the first steel sheet was spaced by 25 mm from the thickness center of the second steel sheet to the fillet welded part side and was spaced by 25 mm from the thickness center of the second steel sheet to a side opposite to the fillet welded part side. That is, a holding interval (span) of the second steel sheet was set as 50 mm. As a result of the tensile test, a case where the first or second steel sheet was fractured was evaluated as "Pass", and a case where the fillet welded part was fractured was evaluated as "Fail".

Further, for reference, each of the T-joints was cut in a direction perpendicular to the weld bead extension direction, and the depth D1 of the valley section and the inclination angle θ1 of the valley section were measured and are shown in Table 2.

TABLE 2

| | Valley Section | Valley Section Depth D1 | Valley Section Inclination Angle θ1 | Pore Defect Ratio |
|---|---|---|---|---|
| Comparative Example (Product in Related Art) | Not Provided | — | — | Fail |
| Example 1 | Provided | 22% | 59° | Pass |
| Example 2 | Provided | 65% | 16° | Pass |
| Example 3 | Provided | 53% | 13° | Pass |
| Example 4 | Provided | 26% | 61° | Pass |

As shown in the table, in Examples 1 to 4 including the valley section, the occurrence of pore defects in the weld bead was able to be suppressed. The valley section was able to be formed together when the second steel sheet was cut in a member shape. That is, these Examples were able to be easily manufactured without requiring an additional process.

In addition, in Examples 1 to 4, the strength was the same as that of the T-joint in the related art. Accordingly, it was clarified that the valley section did not deteriorate the joint strength.

Further, according to the cross section observation of the T-joints, the zinc-based plating was disposed in all of the inclined surfaces forming the valley sections according to Examples 1 to 4. Accordingly, it is presumed that all of the valley sections according to Examples 1 to 4 had excellent corrosion resistance.

Example 2: T-Joint where Weld Metal of Fillet Welded Part was Exposed in Part of Inclined Surface On end portions of various steel sheets (second steel sheets), a first inclined surface that was inclined from the first surface to the center in the sheet thickness direction, a second inclined surface that was inclined from the second surface to the center in the sheet thickness direction, and a fracture surface that was disposed between the first inclined surface and the second inclined surface were formed. Next, the end portion of the second steel sheet was made to vertically abut against the first surface of each of various steel sheets (first steel sheet), and the first surface of the first steel sheet was fillet welded to the first surface of the second steel sheet. Here, as shown in FIG. 3C, fillet welding was performed such that the weld metal of the fillet welded part was exposed in a part of the inclined surface. In addition, the first inclined surface, the second inclined surface, and the fracture surface were formed using a cutting method including: disposing a die including a wedge-shaped first blade portion and a punch including a wedge-shaped second blade portion such that the first blade portion and the second blade portion face each other; disposing the second steel sheet between the die and the punch; and relatively pressing the punch to the die side to cut the second steel sheet. In addition, both of the first steel sheet and the second steel sheet were zinc-based plated steel sheets including a zinc-based plating on both surfaces.

In the end portion of the second steel sheet, inclination angles θ3 and θ4 of the inclined surfaces and a thickness W of the fracture surface (the ratio of percentage to the sheet thickness of the second steel sheet) are as shown in Table 3. The inclination angle θ3 of the first inclined surface refers to an angle between a line perpendicular to the first surface of the second steel sheet and the first inclined surface, and the inclination angle θ4 of the second inclined surface refers to an angle between a line perpendicular to the second surface of the second steel sheet and the second inclined surface (refer to FIG. 9).

TABLE 3

| | End Portion Shape of Second Steel Sheet | | |
|---|---|---|---|
| | Inclination Angle θ3 of First Inclined Surface (Degree) | Inclination Angle θ4 of Second Inclined Surface (Degree) | Thickness W of Fracture Surface (Percentage with respect to Sheet Thickness of Second Steel Sheet) |
| Comparative Example | No Inclined Surface | | |
| Example 1 | 23° | 23° | 27% |
| Example 2 | 45° | 45° | 36% |
| Example 3 | 30° | 30° | 20% |
| Example 4 | 38° | 38° | 18% |

In addition, conditions other than the shapes of the end portions of the steel sheets were as follows.

Sheet thickness of steel sheet: 2.3 mm

Strength of steel sheet: 400 MPa-grade

Component of zinc-based plating: Zn-11% Al-3% Mg-0.2% Si

Adhesion amount of zinc-based plating: 180 g/m$^2$ in total in both surfaces (minimum adhesion amount calculated on average at 3 points)

These steel sheets were provided for fillet gas shielded arc welding under the following conditions to prepare T-joints.

Welding wire: YM-28, manufactured by Nippon Steel Welding & Engineering Co., Ltd. (ϕ1.2 mm)

Welding speed: 40 cm/min

Welding Type: DC-$CO_2$ welding

Shielding gas type: $CO_2$

Shielding gas flow rate: 20 l/min

Welding current: appropriately adjusted in a range of 110 A to 160 A

Arc voltage: appropriately adjusted in a range of 17 V to 24 V

Bead length: 80 mm

An X-ray image of the weld bead of each of the various T-joints obtained as described above was obtained to investigate whether or not pore defects were present. Specifically, the ratio of the sum of the lengths of pore defects in the welding direction to the length of the weld bead in the X-ray image was considered to be the pore defect ratio, a case where the pore defect ratio was 30% or less was evaluated as "Pass", and the determination results are shown in Table 4. Both ends of the bead were not evaluated, and the above-described determination was performed in a region having a length of 50 mm excluding starting and terminal ends of the bead.

In addition, the strength of the T-joint was evaluated using the following method. That is, the second steel sheet was directly held with a grip of a tension tester, and the first steel sheet was held with a grip through a jig, and the steel sheets were pulled in a direction away from each other at a rate of 10 mm/min. The holding position of the second steel sheet was spaced from the first surface of the first steel sheet by 75 mm. The holding position of the first steel sheet was spaced by 25 mm from the thickness center of the second steel sheet to the fillet welded part side and was spaced by 25 mm from the thickness center of the second steel sheet to a side opposite to the fillet welded part side. That is, a holding interval (span) of the second steel sheet was set as 50 mm. As a result of the tensile test, a case where the first or second steel sheet was fractured was evaluated as "Pass", and a case where the fillet welded part was fractured was evaluated as "Fail".

Further, for reference, each of the T-joints was cut in a direction perpendicular to the weld bead extension direction, and the depth D1 of the valley section and the inclination angle θ1 of the valley section were measured and are shown in Table 4.

TABLE 4

| | Valley Section | Valley Section Depth D1 | Valley Section Inclination Angle θ1 | Pore Defect Ratio |
|---|---|---|---|---|
| Comparative Example (Product in Related Art) | Not Provided | — | — | Fail |
| Example 1 | Provided | 12% | 61° | Pass |
| Example 2 | Provided | 68% | 7° | Pass |
| Example 3 | Provided | 42% | 23° | Pass |
| Example 4 | Provided | 36% | 76° | Pass |

As shown in the table, in Examples 1 to 4 including the valley section, the occurrence of pore defects in the weld bead was able to be suppressed. The valley section was able to be formed together when the second steel sheet was cut in a member shape. That is, these Examples were able to be easily manufactured without requiring an additional process.

In addition, in Examples 1 to 4, the strength was the same as that of the T-joint in the related art. Accordingly, it was clarified that the valley section did not deteriorate the joint strength.

Further, according to the cross section observation of the T-joints, the zinc-based plating was disposed in all of the inclined surfaces forming the valley sections according to Examples 1 to 4. Accordingly, it is presumed that all of the valley sections according to Examples 1 to 4 had excellent corrosion resistance.

Example 3: T-Joint where Weld Metal of Fillet Welded Part was Exposed in Entirety of Inclined Surface On end portions of various steel sheets (second steel sheets), a first inclined surface that was inclined from the first surface to the center in the sheet thickness direction, a second inclined surface that was inclined from the second surface to the center in the sheet thickness direction, and a fracture surface that was disposed between the first inclined surface and the second inclined surface were formed. Next, the end portion of the second steel sheet was made to vertically abut against the first surface of each of various steel sheets (first steel sheet), and the first surface of the first steel sheet was fillet welded to the first surface of the second steel sheet. Here, as shown in FIG. 3D, fillet welding was performed such that the weld metal of the fillet welded part was exposed in the entirety of the inclined surface. The first inclined surface, the second inclined surface, and the fracture surface were formed using a cutting method including: disposing a die including a wedge-shaped first blade portion and a punch including a wedge-shaped second blade portion such that the first blade portion and the second blade portion face each other; disposing the second steel sheet between the die and the punch; and relatively pressing the punch to the die side to cut the second steel sheet. In addition, both of the first steel sheet and the second steel sheet were zinc-based plated steel sheets including a zinc-based plating on both surfaces.

In the end portion of the second steel sheet, inclination angles θ3 and θ4 of the inclined surfaces and a thickness W of the fracture surface (the ratio of percentage to the sheet thickness of the second steel sheet) are as shown in Table 5. The inclination angle θ3 of the first inclined surface refers to an angle between a line perpendicular to the first surface of the second steel sheet and the first inclined surface, and the inclination angle θ4 of the second inclined surface refers to an angle between a line perpendicular to the second surface of the second steel sheet and the second inclined surface (refer to FIG. 9).

TABLE 5

| | End Portion Shape of Second Steel Sheet | | |
|---|---|---|---|
| | Inclination Angle θ3 of First Inclined Surface (Degree) | Inclination Angle θ4 of Second Inclined Surface (Degree) | Thickness W of Fracture Surface (Percentage with respect to Sheet Thickness of Second Steel Sheet) |
| Comparative Example | No Inclined Surface | | |
| Example 1 | 15° | 15° | 28% |
| Example 2 | 48° | 29° | 9% |
| Example 3 | 36° | 30° | 12% |
| Example 4 | 45° | 45° | 18% |

In addition, conditions other than the shapes of the end portions of the steel sheets were as follows.

Sheet thickness of steel sheet: 2.3 mm

Strength of steel sheet: 400 MPa-grade

Component of zinc-based plating: Zn-11% Al-3% Mg-0.2% Si

Adhesion amount of zinc-based plating: 180 $g/m^2$ in total in both surfaces (minimum adhesion amount calculated on average at 3 points)

These steel sheets were provided for fillet gas shielded arc welding under the following conditions to prepare T-joints.

Welding wire: YM-28, manufactured by Nippon Steel Welding & Engineering Co., Ltd. (ϕ1.2 mm)

Welding speed: 40 cm/min

Welding Type: DC-$CO_2$ welding

Shielding gas type: $CO_2$

Shielding gas flow rate: 20 l/min

Welding current: appropriately adjusted in a range of 120 A to 170 A

Arc voltage: appropriately adjusted in a range of 17 V to 24 V

Bead length: 80 mm

An X-ray image of the weld bead of each of the various T-joints obtained as described above was obtained to investigate whether or not pore defects were present. Specifically, the ratio of the sum of the lengths of pore defects in the welding direction to the length of the weld bead in the X-ray image was considered to be the pore defect ratio, a case where the pore defect ratio was 30% or less was evaluated as "Pass", and the determination results are shown in Table 6. Both ends of the bead were not evaluated, and the above-described determination was performed in a region having a length of 50 mm excluding starting and terminal ends of the bead.

In addition, the strength of the T-joint was evaluated using the following method. That is, the second steel sheet was directly held with a grip of a tension tester, and the first steel sheet was held with a grip through a jig, and the steel sheets were pulled in a direction away from each other at a rate of 10 mm/min. The holding position of the second steel sheet was spaced from the first surface of the first steel sheet by 75 mm. The holding position of the first steel sheet was spaced by 25 mm from the thickness center of the second steel sheet to the fillet welded part side and was spaced by 25 mm from the thickness center of the second steel sheet to a side opposite to the fillet welded part side. That is, a holding interval (span) of the second steel sheet was set as 50 mm. As a result of the tensile test, a case where the first or second steel sheet was fractured was evaluated as "Pass", and a case where the fillet welded part was fractured was evaluated as "Fail".

Further, for reference, each of the T-joints was cut in a direction perpendicular to the weld bead extension direction, and the depth D1 of the valley section and the inclination angle θ1 of the valley section were measured and are shown in Table 6.

TABLE 6

| | Valley Section | Valley Section Depth D1 | Valley Section Inclination Angle θ1 | Pore Defect Ratio |
|---|---|---|---|---|
| Comparative Example (Product in Related Art) | Not Provided | — | — | Fail |
| Example 1 | Provided | 14% | 60° | Pass |
| Example 2 | Provided | 66% | 25° | Pass |
| Example 3 | Provided | 51% | 21° | Pass |
| Example 4 | Provided | 16% | 77° | Pass |

As shown in the table, in Examples 1 to 4 including the valley section, the occurrence of pore defects in the weld bead was able to be suppressed. The valley section was able to be formed together when the second steel sheet was cut in a member shape. That is, these Examples were able to be easily manufactured without requiring an additional process.

In addition, in Examples 1 to 4, the strength was the same as that of the T-joint in the related art. Accordingly, it was clarified that the valley section did not deteriorate the joint strength.

INDUSTRIAL APPLICABILITY

According to the present invention, a T-joint obtained by fillet welding of a zinc-based plated steel sheet, a building structure, and a method of manufacturing a T-joint can be provided. This T-joint can be easily manufactured, in which the occurrence of pore defects in a weld bead can be suppressed. Accordingly, the present invention has high industrial applicability.

BRIEF DESCRIPTION OF THE REFERENCE SYMBOLS

1: T-joint

11: first steel sheet

111: first surface of first steel sheet
112: second surface of first steel sheet
12: second steel sheet
121: first surface of second steel sheet
1211: first inclined surface (inclined surface)
122: second surface of second steel sheet
1221: second inclined surface (inclined surface)
123: fracture surface
13: fillet welded part
14: zinc-based plating
15: valley section
A: die
A1: first blade portion
B: punch
B1: second blade portion
A': first annular blade portion
A1': cutting edge
B': second annular blade portion
B1': cutting edge

What is claimed is:

1. A T-joint comprising:

a first steel sheet having a first surface and a second surface parallel to each other; and a second steel sheet having a first surface and a second surface parallel to each other, and an inclined surface connected to the second surface thereof to form a tapered end, the second steel sheet being welded to the first steel sheet so that welded metal therebetween forms a fillet welded part, the fillet welded part joining the first steel sheet perpendicularly to the second steel sheet to thereby form the T-joint, wherein the tapered end of the second steel sheet abuts the first surface of the first steel sheet, such that in a cross section taken along a sheet thickness direction of the first steel sheet and a sheet thickness direction of the second steel sheet, the inclined surface forms an acute angle with the first surface of the first steel sheet, the welded metal not being exposed from the inclined surface, a sheet thickness of the second steel sheet is 6.0 mm or less, and at least one of the first surface of the first steel sheet or the first surface of the second steel sheet includes a zinc-based plating.

2. The T-joint according to claim 1, wherein a sheet thickness of the second steel sheet is 4.5 mm or less.

3. The T-joint according to claim 1, wherein a pore defect ratio with respect to an entire length of the fillet welded part is 30% or less.

4. A building structure comprising the T-joint according to claim 1.

5. A method of manufacturing a T-joint, the method comprising:

providing a first steel sheet and a second steel sheet, each having a first surface and a second surface parallel to each other, the second steel sheet further having an inclined surface connected to the second surface thereof to thereby form a tapered end;

placing the second steel sheet perpendicularly on the first surface of a first steel sheet, such that the first surface of the second steel sheet is perpendicular to the first surface of the first steel sheet, to form the T-joint, and the tapered end of the second steel sheet abuts the first surface of the first steel sheet, such that in a cross section taken along a sheet thickness direction of the first steel sheet and a sheet thickness direction of the second steel sheet, the inclined surface forms an acute angle with the first surface of the first steel sheet; and fillet welding the first surface of the first steel sheet to the first surface of the second steel sheet, so that welded metal therebetween forms a fillet welded part that joins the first steel sheet perpendicularly to the second steel sheet to thereby form the T-joint, the welded metal not being exposed from the inclined surface of the second steel sheet, wherein a sheet thickness of the second steel sheet is 6.0 mm or less, and at least one of the first surface of the first steel sheet or the first surface of the second steel sheet includes a zinc-based plating.

6. The method of manufacturing a T-joint according to claim 5, wherein a sheet thickness of the second steel sheet is 4.5 mm or less.

7. The method of manufacturing a T-joint according to claim 5, wherein when the second steel sheet is placed on the first surface of the first steel sheet, in the cross section taken along the sheet thickness direction of the first steel sheet and the sheet thickness direction of the second steel sheet, the end portion of the second steel sheet further has another inclined surface on a first steel sheet side thereof, the another inclined surface forming another acute angle with respect to the first surface of the first steel sheet.

8. The T-joint according to claim 2, wherein a pore defect ratio with respect to an entire length of the fillet welded part is 30% or less.

9. A building structure comprising the T-joint according to claim 2.

10. A building structure comprising the T-joint according to claim 3.

11. A building structure comprising the T-joint according to claim 8.

12. The T-joint according to claim 1, wherein the first surface of the first steel sheet and the inclined surface form a valley section, and a depth of the valley section is 10% or more and 70% or less of the sheet thickness of the second steel sheet.

13. The T-joint according to claim 1, wherein the first surface of the first steel sheet and the inclined surface form a valley section, and an inclination angle of the valley section is at least 10° and less than 80°.

14. The T-joint according to claim 1, wherein the second steel sheet further has another inclined surface connected to the first surface thereof, and the tapered end is formed by the inclined surface and the another inclined surface positioned to form a substantial V shape.

* * * * *